United States Patent
Niewels

(10) Patent No.: US 8,557,156 B2
(45) Date of Patent: Oct. 15, 2013

(54) METHOD AND APPARATUS FOR POST-MOLD COOLING A MOLDED ARTICLE

(75) Inventor: Joachim Johannes Niewels, Thornton (CA)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 268 days.

(21) Appl. No.: 13/107,239

(22) Filed: May 13, 2011

(65) Prior Publication Data

US 2012/0119413 A1    May 17, 2012

Related U.S. Application Data

(63) Continuation of application No. 12/301,731, filed on Nov. 20, 2008, now abandoned, and a continuation-in-part of application No. 11/450,990, filed on Jun. 12, 2006, now Pat. No. 7,421,310.

(51) Int. Cl.
    *B29C 71/00* (2006.01)

(52) U.S. Cl.
    USPC ...... 264/237; 264/348; 264/327; 264/328.14; 264/345; 264/234

(58) Field of Classification Search
    USPC .......... 264/234, 237, 327, 328.14, 345, 348
    See application file for complete search history.

(56) References Cited

U.S. PATENT DOCUMENTS

| | | | |
|---|---|---|---|
| 3,488,801 A | 1/1970 | Havely | |
| 4,162,700 A * | 7/1979 | Kahn | 164/155.6 |
| 4,729,732 A | 3/1988 | Schad | |
| RE33,237 E | 6/1990 | Delfer | |
| 5,176,858 A | 1/1993 | Tsukabe et al. | |
| 5,591,385 A | 1/1997 | Arai et al. | |
| 6,171,541 B1 | 1/2001 | Neter et al. | |
| 6,275,741 B1 | 8/2001 | Choi | |
| 6,312,628 B1 | 11/2001 | Wieder et al. | |
| 6,391,244 B1 | 5/2002 | Chen | |
| 6,461,556 B1 | 10/2002 | Neter | |
| 6,663,813 B2 | 12/2003 | Neter | |
| 6,746,643 B1 | 6/2004 | Kannari | |
| 6,770,239 B2 | 8/2004 | Oueslati et al. | |
| 6,802,705 B2 | 10/2004 | Brand et al. | |
| 6,854,705 B2 | 2/2005 | Wieder | |
| 6,887,418 B2 | 5/2005 | Olaru et al. | |
| 6,916,168 B2 | 7/2005 | Romanski et al. | |

(Continued)

FOREIGN PATENT DOCUMENTS

WO    WO 2005/052525    *    6/2005

*Primary Examiner* — Milton I Cano
*Assistant Examiner* — Jeremiah Smith
(74) *Attorney, Agent, or Firm* — Husky Intellectual Property Services

(57) ABSTRACT

Disclosed, amongst other things, is a method of post-mold cooling of a molded article, the molded article having just been molded within mold halves, the method comprising: receiving, in a post-mold device, the molded article; subjecting the molded article to post-mold cooling, the post-mold cooling including: implementing a first post-mold cooling process portion in the post-mold cooling device at a first temperature; and implementing a second post-mold cooling process in the post-mold cooling device portion at a second temperature, said second post-mold cooling temperature being greater than said first post-mold cooling temperature; determining a switch point; triggering at the switch point, a transition from the first post-mold cooling process portion to the second post-mold cooling process portion.

15 Claims, 5 Drawing Sheets

(56) References Cited

U.S. PATENT DOCUMENTS

| | | |
|---|---|---|
| 6,957,954 B2 | 10/2005 | Neter et al. |
| 7,056,465 B2 | 6/2006 | Unterlander et al. |
| 7,168,942 B1 | 1/2007 | Wieder |
| 7,220,378 B2 | 5/2007 | Cochran et al. |
| 7,303,387 B2 | 12/2007 | Hutchinson et al. |
| 2005/0053691 A1* | 3/2005 | Gabriel .................. 425/552 |
| 2008/0038395 A1* | 2/2008 | Nicol ..................... 425/170 |

* cited by examiner

METHOD AND APPARATUS FOR POST-MOLD COOLING A MOLDED ARTICLE

CROSS REFERENCE TO RELATED APPLICATIONS

The present patent application is a Continuation of U.S. patent application Ser. No. 12/301,731 filed 20 Nov. 2008, now abandoned which is a Continuation in Part and also claims the benefit and priority date of prior U.S. patent application Ser. No. 11/450,990, filed 12 Jun. 2006, now U.S. Pat. No. 7,421,310, issued 2 Sep. 2008.

TECHNICAL FIELD

The present invention generally relates to, but is not limited to a method, molding machine, and computer-readable product for post-mold cooling a molded article, comprising balancing cooling rates between portions of the molded article to substantially reduce post-mold cooling related defects of the molded article, amongst other things.

BACKGROUND

Some injection molded articles, for example plastic preforms of the variety that are for blow molding into beverage bottles, require extended cooling periods to solidify into substantially defect-free molded articles. To the extent that the cooling of the molded article can be effected outside of the injection mold by one or more post-mold devices then the productivity of the injection mold may be increased (i.e. lower cycle time). A variety of such post-mold devices, and related methods, are known and have proven effective at the optimization of the injection molding machine cycle time.

In a typical injection molding system, such as the system 10 depicted with reference to FIG. 1, and as generally described in commonly assigned U.S. Pat. No. 6,171,541 (Inventor: NETER, Witold, et al.; Published: 9 Jan. 2001), just-molded, and hence partially cooled, molded articles 2 are ejected from the mold half 8, when the mold halves 8, 9 are spaced apart, and into holders 50 (i.e. commonly known as a cooling holder, a take-off holder, or a cooling pipe, amongst others). The holders 50 are arranged on a post-mold device 15 (i.e. commonly known as an end-of-arm-tool, carrier plate assembly, removal device, post-cooling apparatus, amongst others), the post-mold device 15 configured to cyclically position the holders 50, arranged on a supporting plate 16, between an in-mold position between the mold halves 8, 9, to receive the molded articles 2, and an out-board position, as depicted, to allow the mold halves 8, 9 to close and begin another molding cycle. The construction and operation of the post-mold device 15, including those having multiple-positions, is generally described in commonly assigned U.S. Pat. RE33,237 (Inventor: DEFLER, Frank; Published: 19 Jun. 1990). Preferably, the molded articles 2 are held in the holders 50 until the molded articles 2 have cooled sufficiently that they may be ejected without risk of further deformation. The injection molding machine includes a controller 30, such as that described in commonly assigned U.S. Pat. No. 6,275,741 (Inventor: CHOI, Christopher; Published: 14 Aug. 2001), for controlling machine-control functions.

The cooling of the molded articles 2 may be assisted by the use of pins 14 for expelling a cooling fluid onto an inner portion of the molded articles 2, as shown with further reference to FIG. 2B. The pins 14 are arranged on another post-mold device 12 (i.e. commonly known as a COOLJET, a trademark of Husky Injection Molding Systems Ltd.), the post-mold device 12 arranged to be cyclically positioned between a cooling position, with the pins 14 positioned adjacent the portion of the molded articles 2, and an out-board position, as depicted. It is also known to use the molded article post-mold device 12 to extract the molded articles 2 from the holders 50 for a re-handling thereof, for instance, to a conveyor.

A portion of the post-mold device 15 depicting a holder 50 arranged on the supporting plate 16 is shown with reference to FIGS. 2A and 2B. The holder 50 is configured in accordance with the general teachings of commonly assigned U.S. Pat. No. 4,729,732 (Inventor: SCHAD, et al.; Published: 4 Mar. 1988). In particular, the holder 50 includes a tapered surface 52 defining a cavity for receiving a portion of the molded article 2, the surface 52 being smaller than the heated molded article. The holder includes a cooling structure operative to shrink the molded article, upon cooling, with the molded article sliding inside the cavity to fit snugly therein. The holder 50 further includes a suction structure adjacent a closed end of the cavity for maintaining the molded article in the holder 50.

As shown with reference to FIG. 2B, the cooling of the molded articles 2 may be assisted by the use of a coolant dispersion device 19 of a post-mold device 13 for dispersion of a coolant, such as cool air, around an exposed outer portion of the molded article; as generally described in commonly assigned U.S. Pat. No. 6,802,705 (Inventor: BRAND, Tiemo, et al.; Published: 12 Oct. 2004).

FIG. 2A depicts an initial position of the molded article 2 in the holder 50 immediately after having been received from the mold.

FIG. 2B depicts a completely seated position of the molded article 2 in the holder 50 after cooling, and related shrinkage, of the molded article 2.

The holder 50 comprises a holder 60 and an insert 70. The insert 70 is arranged in the holder 60 to provide the closed end of the cavity. The suction structure comprises a pressure channel 54 that extends through the insert 70, the channel 54 is connectable to an air pressure source 18, provided in a plate 16 of the post-mold device 15, via a pressure channel 18' configured in the holder 60. Likewise, the cooling structure comprises a coolant channel 62 configured around the holder 60, and enclosed by a holder sleeve 64, the coolant channel 62 connectable to a coolant source 17, provided in the plate 16, via a coolant channel 17' in the plate 16. The holder 60 and the insert 70 are held on the plate 16 by a fastener 72.

The coolant source 17 in the plate 16 is typically directly connected to a plant-wide coolant source. Typical plant-wide coolant sources include a chiller or a cooling tower to remove the heat added to the coolant from the molded article in the holder. Presently, faced with the problem of improving the efficiency of a molding cycle the common general knowledge in the molding art is to remove heat from the molded article holder as quickly as possible. The coolant, typically water, is preferably cooled to a temperature in the range of 6-10° C. In some high humidity molding environments the coolant may be kept warmer to avoid unwanted water condensation on the holder 50.

As can be seen with reference to FIGS. 2A and 2B, a first portion of the molded article 2' that is received in the cooled holder 50 will be cooled, by the holder 50, at a first rate while a second portion of the molded article 2" that is outside of the holder 50 will be cooled at a second rate. Under certain circumstances the second portion of the molded article 2" can take longer to cool than the first portion of the molded article 2'. The relative cooling between the first and second portions of the molded article 2', 2" may be affected by one or more variables such as the distribution of plastic in the molded article 2, the thermal profile of the molded article when ejected from the mold 8, 9, the relative first and second rates of cooling, amongst others. Whenever the time required for post-mold cooling the second portion of the molded article 2" is the limiting factor there is the risk that the first portion of the molded article 2' may become over-cooled. An over-cooled first portion of the molded article 2' is prone to deform.

Problems associated with cooling molded articles in the holder 50 may include localized sink marks and ovality.

With the relatively long molding cycle-times of the past it was generally possible to adjust the geometry of the cavity in the holder 50 to address the known defects. For instance, ovality defects may be addressed by adjusting the cavity in the holder 50 to be slightly smaller.

With increasingly aggressive molding cycle-time it is not always possible to address the defects by simple adjustment of the cavity geometry in the holder as adjusting the geometry for one defect may have the effect of making the another defect more prominent.

SUMMARY

According to a first broad aspect of the present invention, there is provided a method of post-mold cooling of a molded article, the molded article having just been molded within mold halves, the method comprising: receiving, in a post-mold device, the molded article; subjecting the molded article to post-mold cooling, the post-mold cooling including: implementing a first post-mold cooling process portion in the post-mold cooling device at a first temperature; and implementing a second post-mold cooling process in the post-mold cooling device portion at a second temperature, said second post-mold cooling temperature being greater than said first post-mold cooling temperature; determining a switch point; triggering at the switch point, a transition from the first post-mold cooling process portion to the second post-mold cooling process portion.

DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Figure 3:
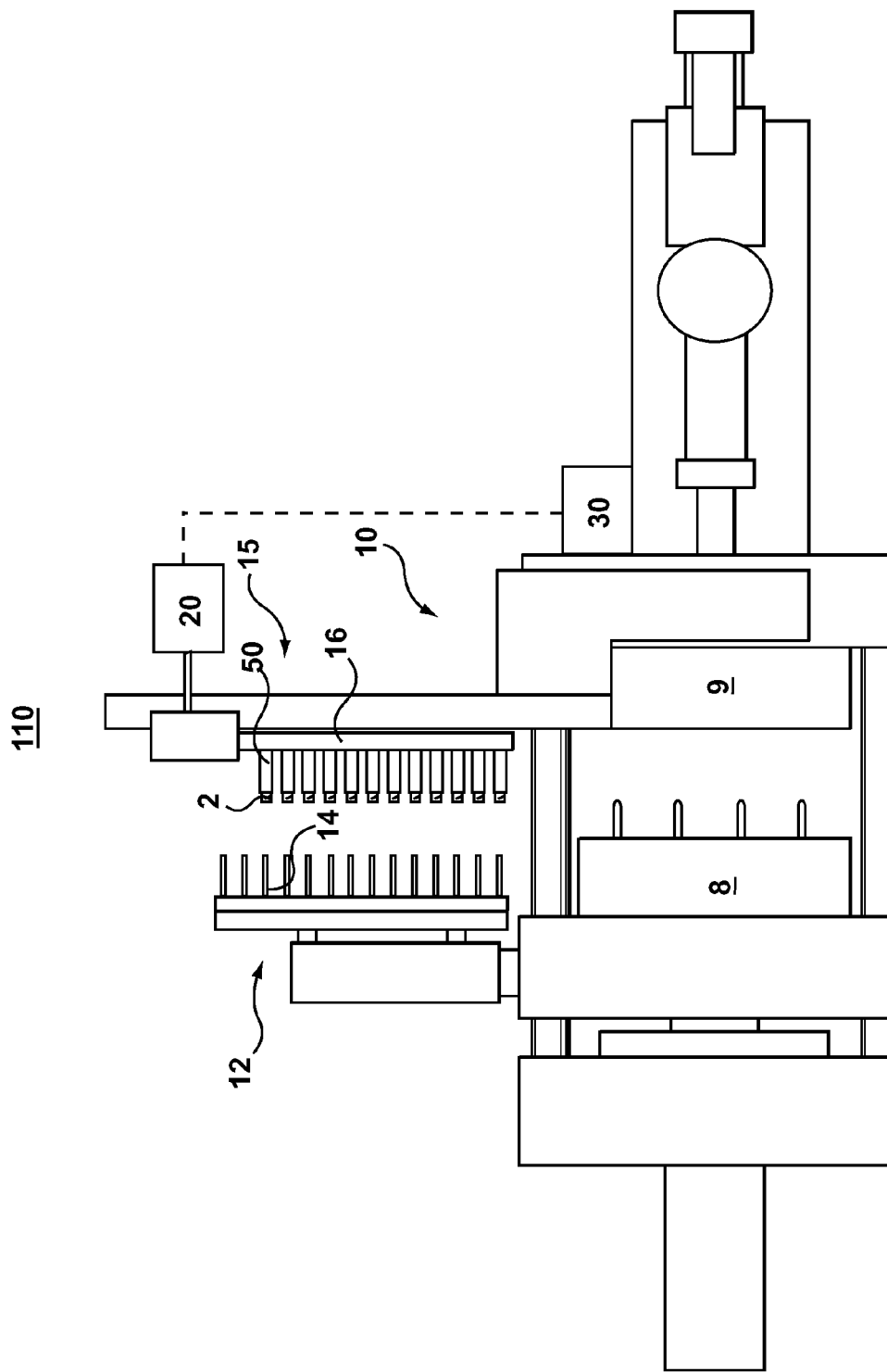
FIG. 3 is a top elevation view of an injection molding system in accordance with a non-limiting embodiment of the present invention.

FIG. 3 is an injection molding system 110 in accordance with a non-limiting embodiment of the present invention. The molding system 110 is similar to the known molding system 10 described hereinbefore which included the post-mold devices 12, 15. The molding system 110 further includes a temperature control device 20 for controlling the temperature of the holder 50, on post-mold device 15, to avoid imparting cooling related defects to the molded article 2.

Figure 1:
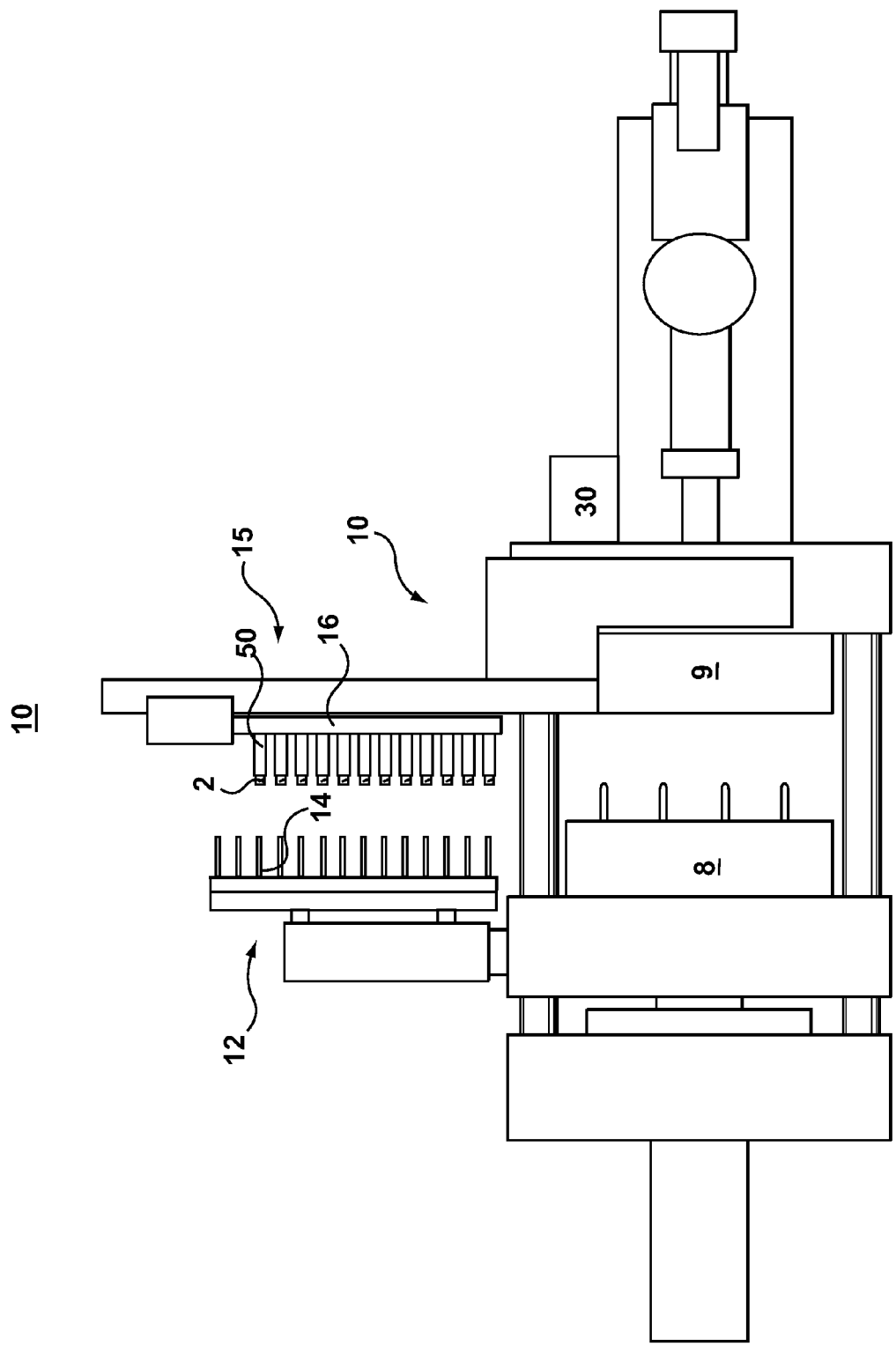
FIG. 1 is a top elevation view of a known injection molding system.
Figure 2A:
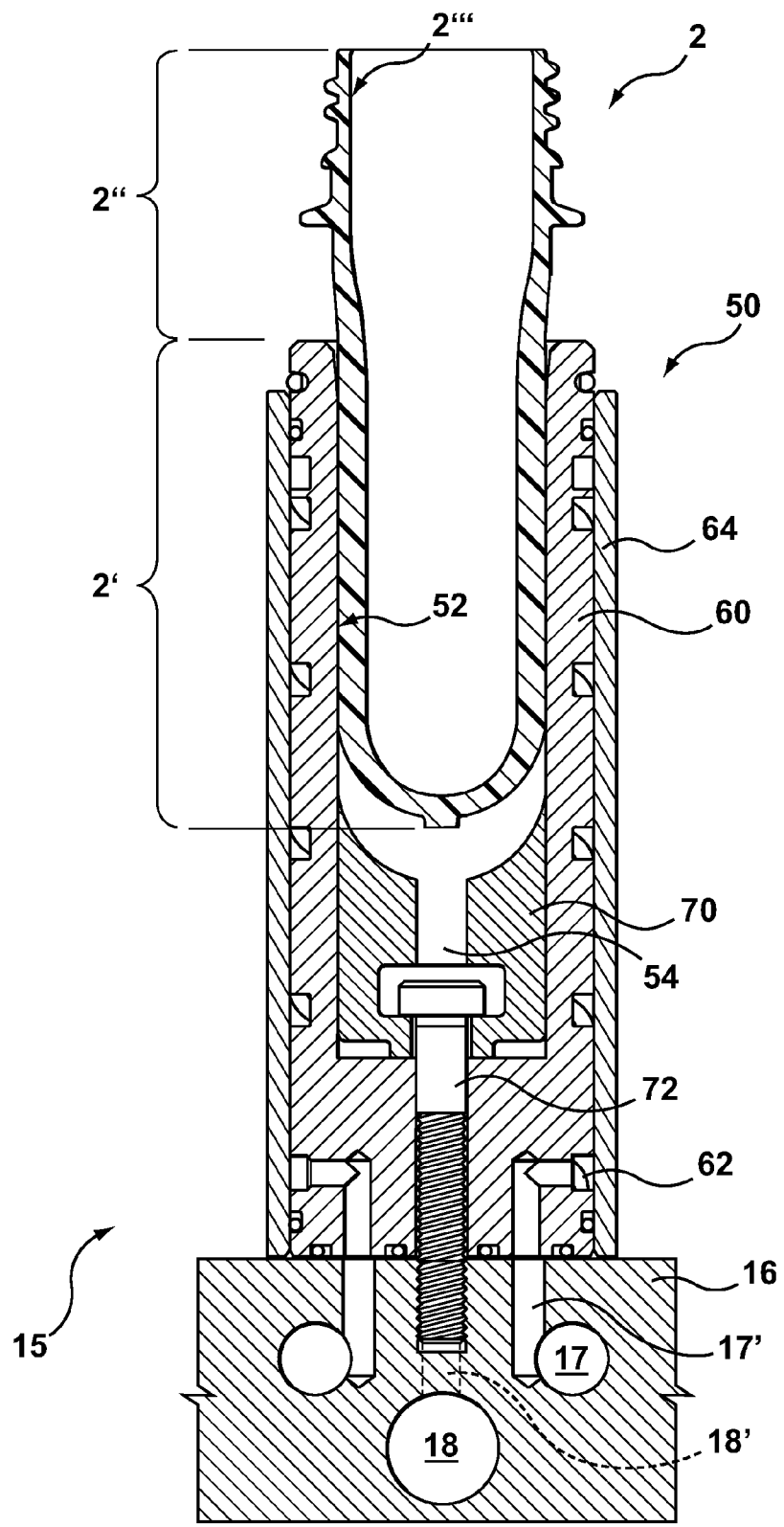
FIG. 2A is a section view through a post-mold device depicted in the injection molding system of FIG. 1 at a time before the molded article has completely seated therein.
Figure 2B:
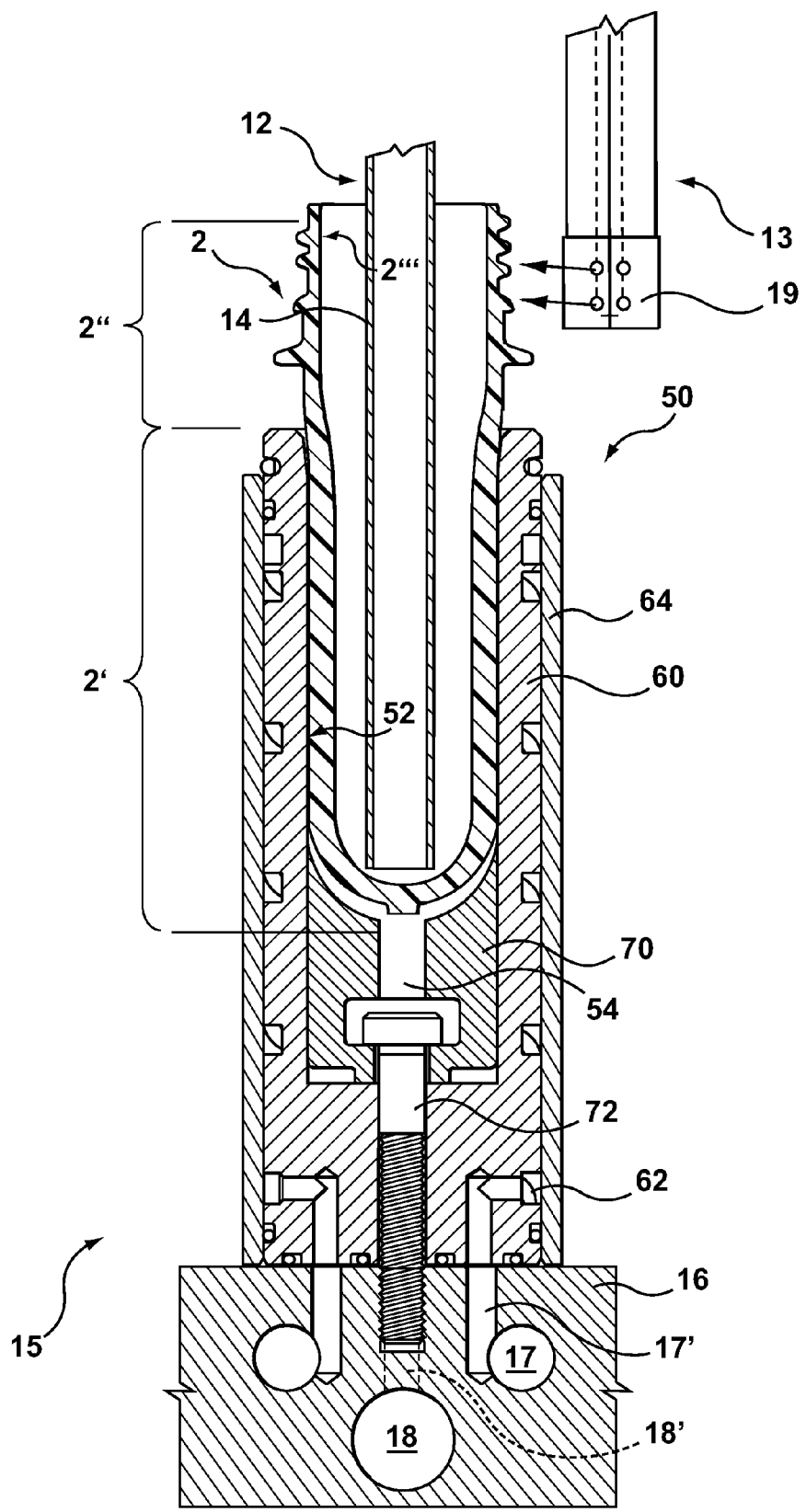
FIG. 2B is a section view through a post-mold device depicted in the injection molding system of FIG. 1 at a time after the molded article has completely seated therein.

The method in accordance with an embodiment of the present invention includes balancing cooling rates between the portions 2', 2", 2''' of the molded article 2, as shown with reference to FIG. 2B, to substantially reduce post-mold cooling related defects of the molded article.

The balancing of the cooling rates between portions 2', 2", 2''' is preferably controlled such that each of the portions of the molded article 2', 2", 2''' arrive at respective ejection temperatures, that substantially precludes post-ejection defects, at the substantially the same time.

The method preferably includes controlling the cooling rate imposed on one or more of the portions of the molded article 2', 2", 2''' by one or more post-mold devices 12, 13, 15 to effect the balancing of the cooling rates between the portions 2', 2", 2'''.

In accordance with an embodiment of the present invention the method includes arranging a first portion of the molded article 2' in a holder 50 of a post-mold device 15 and controlling the temperature of the holder 50 to avoid imparting cooling related defects to the molded article (2).

Preferably, the controlling of the temperature of the holder 50 minimizes a temperature differential in the molded article 2 at a transition between the first portion of the molded article 2' arranged in the holder 50 and a second portion of the molded article 2" that is outside of the holder 50.

Preferably, controlling the temperature of the holder 50 includes controlling the temperature of a coolant media that is circulated for controlling the temperature of the holder 50. The temperature control of the coolant media may be performed by circulating the coolant media through the temperature control device 20.

Alternatively, the controlling the temperature of the holder 50 includes the controlling the flow rate of a coolant that is circulated to control the temperature of the holder 50.

Preferably, controlling the temperature of the holder 50 includes selecting a temperature of the holder 50 whereby the first and second portions of the molded article 2', 2''' are controllably cooled at first and second cooling rates such that the molded article portions 2', 2''' arrive at ejection safe temperatures at substantially the same time.

A technical effect of the embodiment of the present invention is a reduction in the formation of defects in the molded article 2 that are related to post-mold cooling of the molded article.

In accordance with the embodiment of the present invention, the technical effect was prominent when the temperature of the coolant media for cooling of the holder 50 was heated above ambient temperature and below a glass temperature of a resin used to form the molded article 2. More preferably, the temperature of the holder 50 is selected to be between about 35° C. and 65° C. More preferably still the temperature of the holder 50 is selected to be about 50° C.

Preferably, the temperature of the holder 50 is homogenous. Alternatively, a subtle gradient along the molded article may be useful to reduce local defects, such as sink marks, while still avoiding ovality defects.

Preferably, the molding machine controller 30 controls the temperature control device 20 for controlling the temperature of the coolant media using closed-loop control. Alternatively, the temperature control may be open-loop control. Alternatively, the temperature control device 20 may include a dedicated controller, not shown, the dedicated controller may be operatively linked or entirely independent from the machine controller 30. Accordingly, the method of controlling the temperature of the coolant media may further include the sending coolant temperature set-points from a molding machine controller 30 to the dedicated controller in the temperature control device 20. In addition, operational feedback from the temperature control device 20 may be shared with the molding machine controller 30.

In accordance with an alternative embodiment of the invention, the cooling rate of one or both or the molded article portions (2", 2'") may be effected similarly by controlling the post-mold devices 13, 15. For example, the coolant flow rate, or coolant temperature may be controlled through the pin 14 and/or dispersion device 19 of post-mold devices 12, 13.

Any type of controller or processor may be used to balance the cooling rates between portions (2', 2", 2'") of the molded article (2), as described above. For example, one or more general-purpose computers, Application Specific Integrated Circuits (ASICs), Digital Signal Processors (DSPs), gate arrays, analog circuits, dedicated digital and/or analog processors, hard-wired circuits, etc., may receive input from the feedback signals described herein. Instructions for controlling the one or more of such controllers or processors may be stored in any desirable computer-readable medium and/or data structure, such floppy diskettes, hard drives, CD-ROMs, RAMs, EEPROMs, magnetic media, optical media, magneto-optical media, etc. An expert system may be implemented in the controller 30 to automatically control the post-mold devices 12, 13, 15 to adjust the cooling rates of the portions (2', 2", 2'") based upon quantitative and/or qualitative feedback on the state of the molded article 2.

Figure 4:
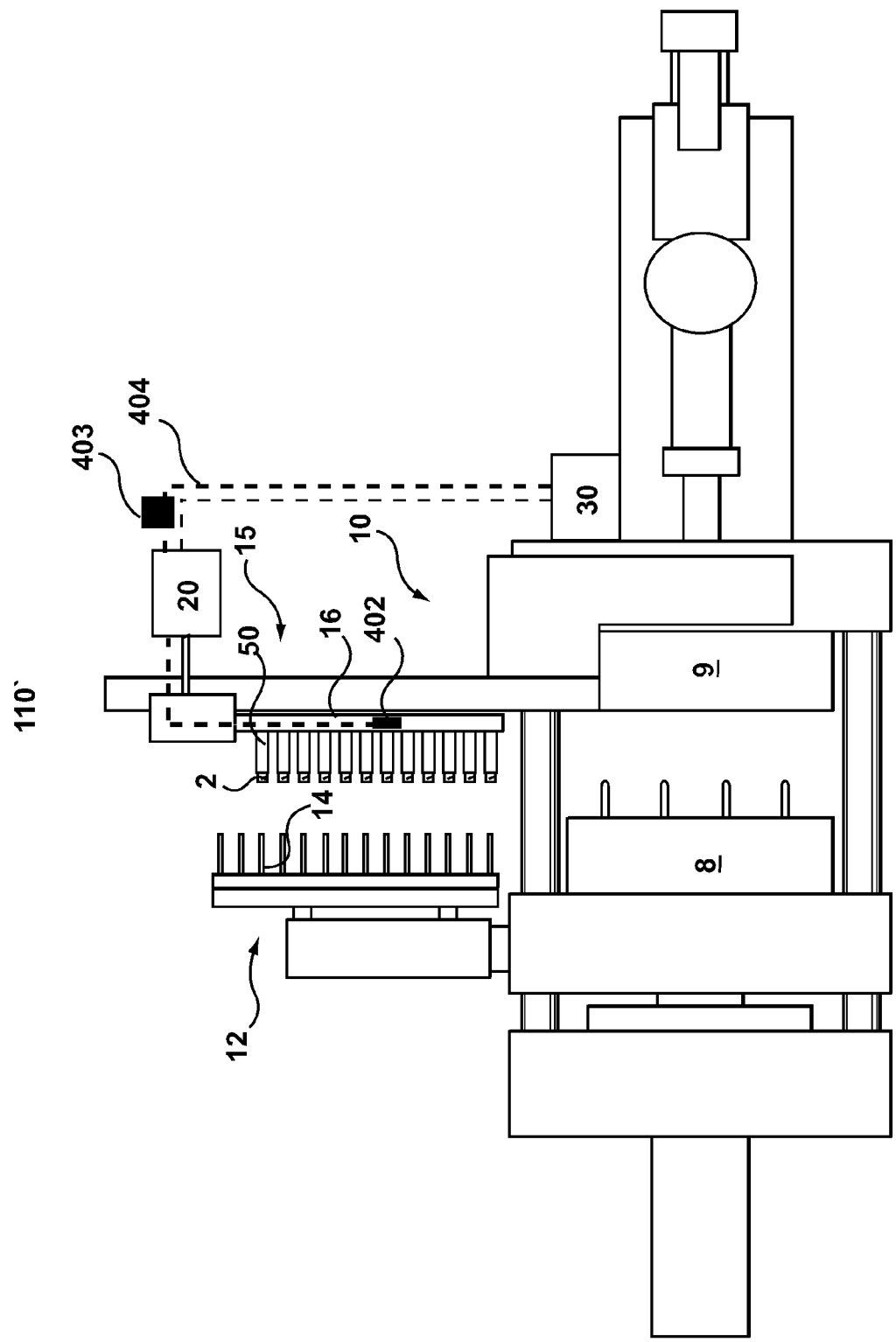
FIG. 4 is a top elevation view of an injection molding system in accordance with another non-limiting embodiment of the present invention.

With reference to FIG. 4, another non-limiting embodiment of a molding system 110' will now be described in greater detail. The molding system 110' can be substantially similar to the above-described molding system 110, but for the specific differences to be discussed herein below and, as such, like elements are denoted with like numerals. Within these non-limiting embodiments of the present invention, the molding system 110' comprises a sensor 402 associated with the post-mold device 15.

Generally speaking, the purpose of the sensor 402 is to determine temperature associated with operation of the holders 50. It should be expressly understood that in some embodiments of the present invention, the sensor 402 is configured to measure the temperature, however in other embodiments, the sensor 402 can measure another parameter which can then be used to determine a temperature value. Examples of such a proxy value of an operational parameter that can be used include, but are not limited to, pressure exerted by a preform 2 against a wall of the holder 50 and the like. In some embodiments of the present invention, the sensor 402 can be implemented as a thermocouple. In other embodiments of the present invention, the sensor 402 can be implemented as a thermistor. In yet other embodiments of the present invention, the sensor 402 can be implemented as a thermal emission camera (ex. an infrared camera and the like). In yet further non-limiting embodiments, the sensor 402 can be implemented as a pressure measurement device (ex. a pressure transducer and the like). Other alternative implementations are, of course, possible.

In some embodiments of the present invention, the sensor 402 can comprise a single sensor 402 associated with the post-mold device 15. In other embodiments of the present invention, the sensor 402 can comprise a plurality of sensors 402; each of the plurality of sensors 402 being associated with a respective holder 50. In alternative non-limiting embodiments of the present invention, which are particularly applicable in those implementations where the post mold devices 12, 15 are configured to implement a so-called multi-position post-mold cooling function, the sensor 402 can comprise a plurality of sensors 402; each of the plurality of sensors 402 being associated with a selected one of the holders 50 in a given position of the post-mold cooling cycle. In other words, the sensor 402 can comprise a plurality of sensors 402; each of the plurality of sensors associated with a given position of the post-mold cooling function. For example, in a molding system 110' which implements a three-position post-mold cooling function, three instances of the sensors 402 can be used.

The sensor 402 is configured to generate a signal 403 representative of an operational parameter (such as the temperature or the like), associated with operation of the holders 50.

The sensor 402 is coupled to the controller 30 via a communication link 404. In some embodiments of the present invention, the communication link 404 can be implemented as a wired link. As will be appreciated by those of skill in the art, within these embodiments of the present invention, the wired link is configured to withstand operating temperatures associated with the molding system 110'. In other non-limiting embodiments of the present invention, the communication link 404 can be implemented as a wireless link. Those skilled in the art will appreciate that a plethora of possible wireless communication protocols can be used. Examples of wireless communication protocols that can be used include, but are not limited to, Wi-Fi, BlueTooth, Wi-Max and the like. The sensor 402 is operable to transmit the signal 403 to the controller 30 via the communication link 404. Naturally, in alternative non-limiting embodiments of the present invention, the sensor 402 can be coupled to a dedicated controller (not depicted) separate from the controller 30.

How the sensor 402 generates and transmits the signal 403 is not particularly limited. For example, the sensor 402 can sense an operating parameter, generate the signal 403 representative of the sensed operating parameter and to transmit the signal 403 to the controller 30 at regular time intervals. In other non-limiting embodiments of the present invention, the sensor 402 can sense an operating parameter, generate the signal 403 representative of the sensed operating parameter and to transmit the signal 403 to the controller 30 at a beginning of a given position of the post-mold cooling cycle. For example, within a four-position post-mold cooling cycle, the sensor 402 can repeat this routine at a beginning of each of the four-positions of the post-mold cooling cycle.

Alternatively, the sensor 402 can perform a similar routine at a beginning of a first position of a multi-position post-mold cooling cycle. In yet further non-limiting embodiments, the sensor 402 can perform the same routine upon receipt of a request signal (not depicted) from the controller 30.

Given the architecture of FIG. 4, it is possible to implement a method for post-mold cooling according to another non-limiting embodiment of the present invention.

At a first instance in time, i.e. at a beginning of a post-mold cooling cycle, a molded article 2 is received within the holder 50 and a first portion of the post-mold cooling cycle begins. Within the first portion of the post-mold cooling cycle, the temperature control device 20 controls the coolant media that is circulated for controlling the temperature of the holder 50 to a first cooling temperature. As a non-limiting example and not as a limitation, the first cooling temperature can be 10° C.

At a second instance in time, i.e. at some point in time after the first instance in time, a second portion of the post-mold cooling cycle commences. Within the second portion of the post-mold cooling cycle, the temperature control device 20 controls the temperature of the coolant media that is circulated for controlling the temperature of the holder 50 to a second cooling temperature, which is greater then the first cooling temperature. As a non-limiting example and not as a limitation, the second cooling temperature can be 65° C.

A point in time when the first post-mold cooling portion ends and the second post-mold cooling portion commences, can be broadly called a switch point. How the switch point is determined is not particularly limited and can be implemented in several possible alternatives.

Pre-Determined Point in Time

In some embodiments of the present invention, the switch point can be implemented as a pre-determined point in time. For example, an operator operating the molding system 110' can set-up the switch point using, for example, a human-machine interface (not depicted) of the molding system 110'. This switch point can be expressed as a value representative of time elapsed since a beginning of a post-mold cooling cycle (ex. 2 seconds, 3 seconds, 4 seconds, 5 seconds or any other suitable value). Alternatively, this switch point can be expressed as a value representative of number of positions of the post-mold cooling cycle expired after a beginning of the post-mold cooling cycle (ex. a switch point after 1 position is completed, 2 positions are completed, 3 positions are completed, 4 positions are completed, 2.5 positions are completed, 3.2 positions are completed and the like). Alternatively, a combination of the number of positions and elapsed time since the beginning of the last position can be used (ex. 2 positions and 1 second, etc.).

Within these embodiments of the present invention, the switch point can be adjusted from time to time. For example, the operator can change the switch point using, for example, the human-machine interface (not depicted) to move the switch point closer or further way from the beginning of the post mold cooling cycle.

Temperature Value

In alternative non-limiting embodiments of the present invention, the switch point can be implemented as a temperature value associated with operation of the holders 50 (i.e. a target temperature). For example, the switch point can be expressed as a temperature value associated with molded articles 2 being treated in a given position of the post-mold cooling cycle or a holder 50. As an example and not as a limitation, the switch point can be expressed as 65° C. In other words, when the molded article 2 reaches the temperature of 65° C., a switch between the first post-mold cooling portion and the second post-mold cooling portion occurs.

Within these embodiments of the present invention, the controller 30 monitors the signal(s) 403 received from the sensor 402 or the plurality of sensors 402. When a given signal 403 is indicative of a given molded article 2 reaching the target temperature, a determination is made that the switch point has been reached.

In those embodiments of the present invention, where the sensor 402 is implemented as a plurality of sensors 402; each of the plurality of sensors being associated with a given holder 50; the controller 30 receives a plurality of signals 403 from each of the plurality of sensors 402. The controller 30 then individually analyzes each of the plurality of signals 403.

In those embodiments of the present invention, where the sensor 402 is implemented as a plurality of sensors 402; each of the plurality of sensors being associated with a given position of the post-mold cooling function; the controller 30 receives a plurality of signals 403 from each of the plurality of sensors 402. The controller 30 then individually analyzes each of the plurality of signals 403 for a given position of the post-mold cooling cycle. Within these embodiments of the present invention, an assumption is made that molded articles 2 being treated within the same position of the post-mold cooling cycle have substantially the same temperature.

In those embodiments of the present invention, where the sensor 402 is implemented as a single sensor, the controller 30 receives a single signal 403 from the single sensors 402. The controller 30 then analyzes the single signal 403 and performs a calculation routine to determine a respective temperature associated with each position of the multi-position post-mold cooling cycle.

The temperature control of the coolant media may be performed by circulating the coolant media through the temperature control device 20. How the temperature control device 20 controls the coolant media is not particularly limited. In some embodiments of the present invention, the temperature control device 20 can control the coolant media by heating and/or cooling the coolant media. In alternative non-limiting embodiments, the temperature control device 20 can control the coolant media by controlling a rate of flow of the coolant media. In yet further non-limiting embodiments of the present invention, the temperature control device 20 can control the coolant media by shutting off supply of the coolant media at the second post-mold cooling portion. Other alternatives are, of course, also possible. Yet in further non-limiting embodiments of the present invention, the temperature control device 20 can control the coolant media by changing the coolant media from a first type of coolant media to a second type of coolant media. Other alternatives are, of course, also possible.

Accordingly, it should now become apparent that the method of controlling post-mold cooling broadly includes steps of balancing cooling rates during a post-mold cooling function. More specifically, the balancing of cooling rates may include balancing of cooling rates among various portions 2', 2", 2'" of the molded article 2. Balancing of cooling rates may be further implemented using two methods of various embodiments of the present invention:

(a) increasing the initial cooling rate (for example, by increasing the cooling temperature) to ensure that the various portions 2', 2", 2'" of the molded article 2 reach a target exit temperature at substantially the same time. In some embodiments of the present invention, this substantially same time substantially coincide with an instance of time when the molded article 2 is ready for ejection from the post-mod device 15. In other words, the balancing may include controlling an initial cooling rate to decrease a temperature differential between a just-molded article 2 and cooling media (b) Initially cooling the molded article 2 at a first temperature, then at a switch point commencing cooling at a second temperature; to ensure that the various portions 2', 2", 2'" of the molded article 2 reach the target exit temperature at substantially the same time. In some embodiments of the present invention, this substantially same time substantially coincide with an instance of time when the molded article 2 is ready for ejection from the post-mod device 15.

Accordingly, a technical effect of some embodiments of the present invention leads to reduced slow-cooling induced defects (ex. crystallinity, ovality, etc.). Another technical effect of the embodiments of the present invention is that the molded article 2 reaches a target exit temperature at a point of time that substantially coincides with a point in time when the molded article 2 is removed from the post-mold device 15.

The description of the embodiments provides examples of the present invention, and these examples do not limit the scope of the present invention. For example, balancing of cooling rates will be specific to both molded article (e.g. preform) design and molding cycle time. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A method of post-mold cooling of a molded article, the molded article having just been molded within mold halves, the method comprising:
    receiving, in a post-mold device, the molded article from within the mold halves;
    subjecting the molded article to post-mold cooling process in the post-mold device, the post-mold cooling process including:
    controlling the temperature of coolant media to a first temperature using a temperature control device;
    implementing a first post-mold cooling process portion in the post-mold cooling device at the first temperature; and
    controlling the temperature of the coolant media to a second temperature using the temperature control device;
    triggering at a predetermined switch point, a transition from the first post-mold cooling process portion to a second post-mold cooling process portion; and
    implementing the second post-mold cooling process portion in the post-mold cooling device at the second temperature, said second temperature being greater than said first temperature.

2. The method of claim 1, further comprising balancing cooling rates between said first temperature and said second temperature is executed such that the molded article reaches the target exit temperature at a point of time that substantially coincides with removal of the molded article from post-mold cooling.

3. The method in accordance with claim 1, wherein said switch point comprises a temperature value; and wherein the method further comprises determining a temperature associated with operation of a post-mold device.

4. The method in accordance with claim 3, wherein said determining comprises receiving a signal (403) from a sensor (402), the signal (403) indicative of the temperature associated with operation of a post-mold device (15).

5. The method in accordance with claim 4, wherein said sensor (402) comprises a single sensor (402), and wherein said post-mold device (15) implements a multi-position post-mold cooling function; and wherein the method further comprises, based on said signal (402), determining a temperature value associated with each position of the multi-position post-mold cooling function.

6. The method in accordance with claim 5, wherein said post-mold device (15) implements a multi-position post-mold cooling function; and wherein said sensor (402) comprises a plurality of sensor (402), each of the plurality of sensors being associated with a given holder (50) in a given position of the multi-position post-mold cooling function.

7. The method in accordance with claim 5, wherein said sensor (402) comprises a plurality of sensor (402), each of the plurality of sensors being associated with a given holder (50) of the post-mold device (15).

8. The method in accordance with claim 1, wherein said switch point comprises an indication of a point in time.

9. The method in accordance with claim 8, wherein said indication of a point of time comprises one of a time value, a value representative of a number of positions of the post-mold cooling cycle and a combination thereof.

10. The method in accordance with claim 1, further comprising selecting the first temperature such as to decrease a temperature differential between a just-molded article and cooling media.

11. The method of claim 1, wherein the first post-mold cooling process portion is implemented at an instance of time before the second post-mold cooling process portion.

12. The method of claim 1, wherein said determining of the switch point is executed prior to executing the post-mold cooling.

13. The method of claim 1, wherein said determining of the switch point comprises appreciating a pre-set switch point.

14. The method of claim 1, wherein said transition is implemented by means of switching one of a temperature or the rate of flow of the cooling media.

15. The method of claim 1, wherein said transition is implemented by means of switching the type of cooling media from the first type of coolant media to a second type of coolant media.

* * * * *